March 25, 1952 G. L. FREDENDALL ET AL 2,590,306

COMBINED TELEVISION AND SOUND SYSTEM

Filed May 29, 1943 6 Sheets-Sheet 1

Inventors
Gordon L. Fredendall
Alfred C. Schroeder
By H. S. Grover
Attorney

COMBINED TELEVISION AND SOUND SYSTEM

Inventors
GORDON L. FREDENDALL
& ALFRED C. SCHROEDER
By H. S. Grover
Attorney

March 25, 1952 G. L. FREDENDALL ET AL 2,590,306

COMBINED TELEVISION AND SOUND SYSTEM

Filed May 29, 1943 6 Sheets-Sheet 3

Inventors
GORDON L. FREDENDALL
ALFRED C. SCHROEDER
By H. S. Grover
Attorney

COMBINED TELEVISION AND SOUND SYSTEM

Inventors
GORDON L. FREDENDALL
& ALFRED C. SCHROEDER
By H. S. Grover
Attorney

COMBINED TELEVISION AND SOUND SYSTEM

Filed May 29, 1943 6 Sheets-Sheet 5

TO Fig. 11.

INVENTORS.
GORDON L. FREDENDALL,
ALFRED C. SCHROEDER
BY H. S. Grover
ATTORNEY.

March 25, 1952 G. L. FREDENDALL ET AL 2,590,306

COMBINED TELEVISION AND SOUND SYSTEM

Filed May 29, 1943 6 Sheets-Sheet 6

INVENTORS.
GORDON L. FREDENDALL,
ALFRED C. SCHROEDER
BY H. S. Grover
ATTORNEY.

Patented Mar. 25, 1952 2,590,306

UNITED STATES PATENT OFFICE 2,590,306

COMBINED TELEVISION AND SOUND SYSTEM

Gordon L. Fredendall and Alfred C. Schroeder, Feasterville, Pa., assignors to Radio Corporation of America, a corporation of Delaware Application May 29, 1943, Serial No. 488,968

1 Claim. (Cl. 178—5.8)

The present invention relates to intelligence transmission systems and more particularly to television systems in which intelligence signals, such as sound signals, for example, are generated and transmitted along with the picture signals on a single carrier for reception by single channel carrier current or radio receivers.

In accordance with this invention successive time intervals provided, for example, by the retrace of the uni-lateral scanners at the transmitter and receivers are utilized in a novel manner for the transmission of signals representing special intelligence such as a sound accompaniment for the visual program. This accompaniment may be synchronized speech, music or other appropriate sound effects. By uni-lateral scanning is meant scanning action taking place always in one direction on a viewing area with inactive return traces joining the ends of the active scanning excursions. Although an illustrative embodiment of the invention is disclosed in connection with a system employing uni-lateral scanning with recurring retrace times, it will be understood that the invention is not so limited, but may be practiced in connection with any television system in which time intervals not occupied by the transmission of picture intelligence systems may be arranged.

The invention provides for the derivation of signals representing sound, without in any way modifying the action, with respect to the usual transmitting and picture reproducing functions at the transmitter and receivers respectively, of a television system in which it is employed. No storage of signals representative of sound is necessary at any stage of the signal deriving process to be disclosed herein, either by means of special storage tubes or time delay networks. Also, in the preferred mode of operation of a television system embodying the present invention, the customary synchronizing signals are substantially unmodified and, therefore, the organization and functions of the signal combining and signal separating circuits are not disturbed.

A primary object of the present invention is to provide a novel and improved method of and apparatus for the transmission of video signals and additional intelligence signals such as sound signals on a single carrier in a noninterfering manner.

Another object of the present invention is to provide for the derivation, transmission, and reception of special intelligence signals wholly within the time intervals occurring between the transmission and reception of signals representing predetermined portions of a field view.

Another object of the invention is to provide a novel method of and means for the separation of a signal derived from an original sound signal from a picture and sound modulated carrier.

A still further object of the invention is to provide a novel method of and means for the translation and reproduction in the form of audio variations of a signal derived from an original audio signal.

A still further object of the invention is to provide a novel system for combined visual and audible signals which is relatively simple in construction and arrangement of parts; easy to operate, capable of being installed in existing apparatus with a minimum of alteration and inconvenience; and which reduces the expense of transmitting combined sight and sound signals by avoiding the necessity of utilizing separate transmitters, modulators, carrier frequency generators and the like for the separate types of transmission signals.

Other and more specific objects of the invention will become apparent from a consideration of the following specification and claims in connection with the accompanying drawings illustrating one preferred form of the invention, in which:

Figures 2, 16:
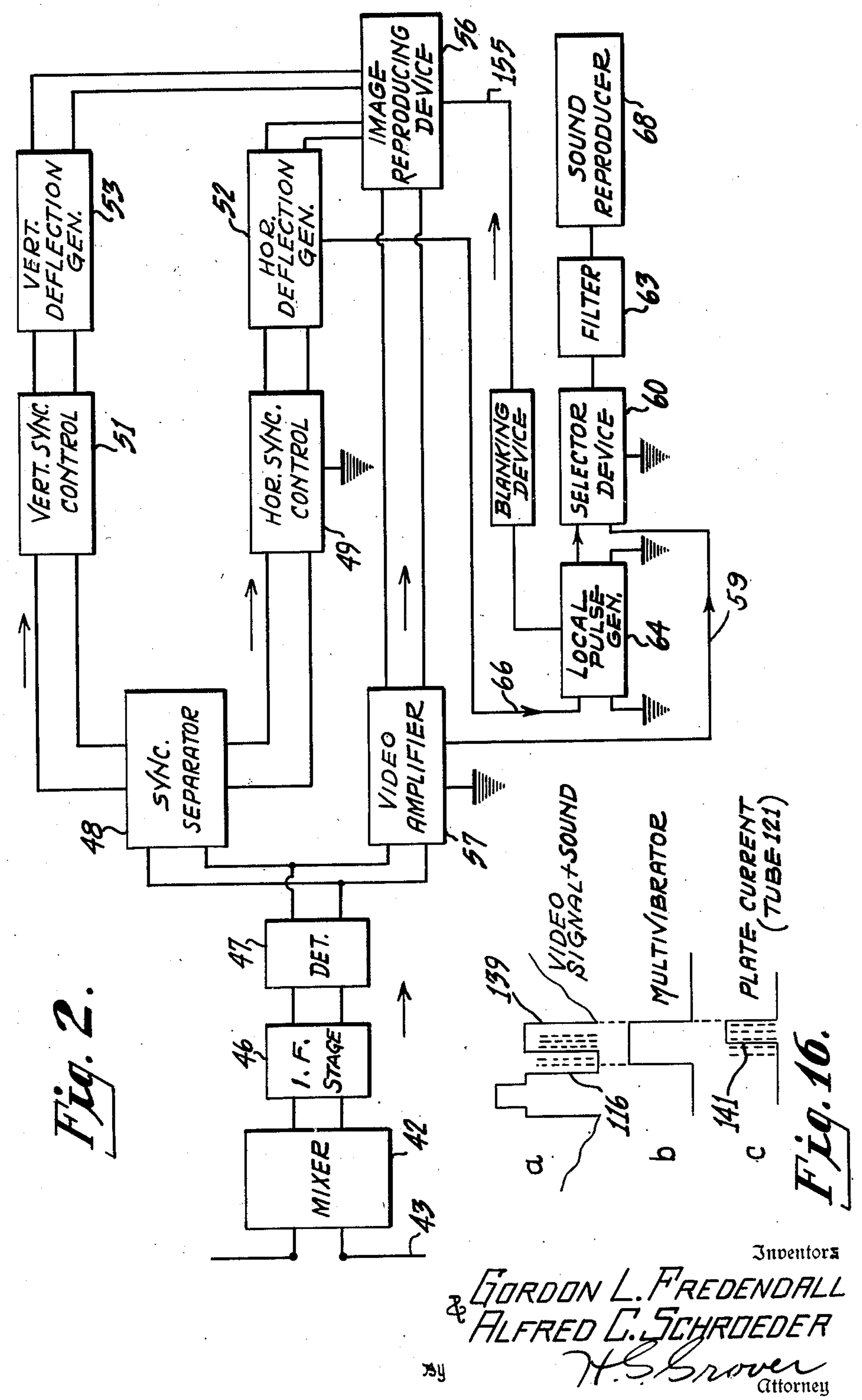
Fig. 2 illustrates in a similar manner suitable arrangements for receiving apparatus embodying the invention.
Figures 3, 4:
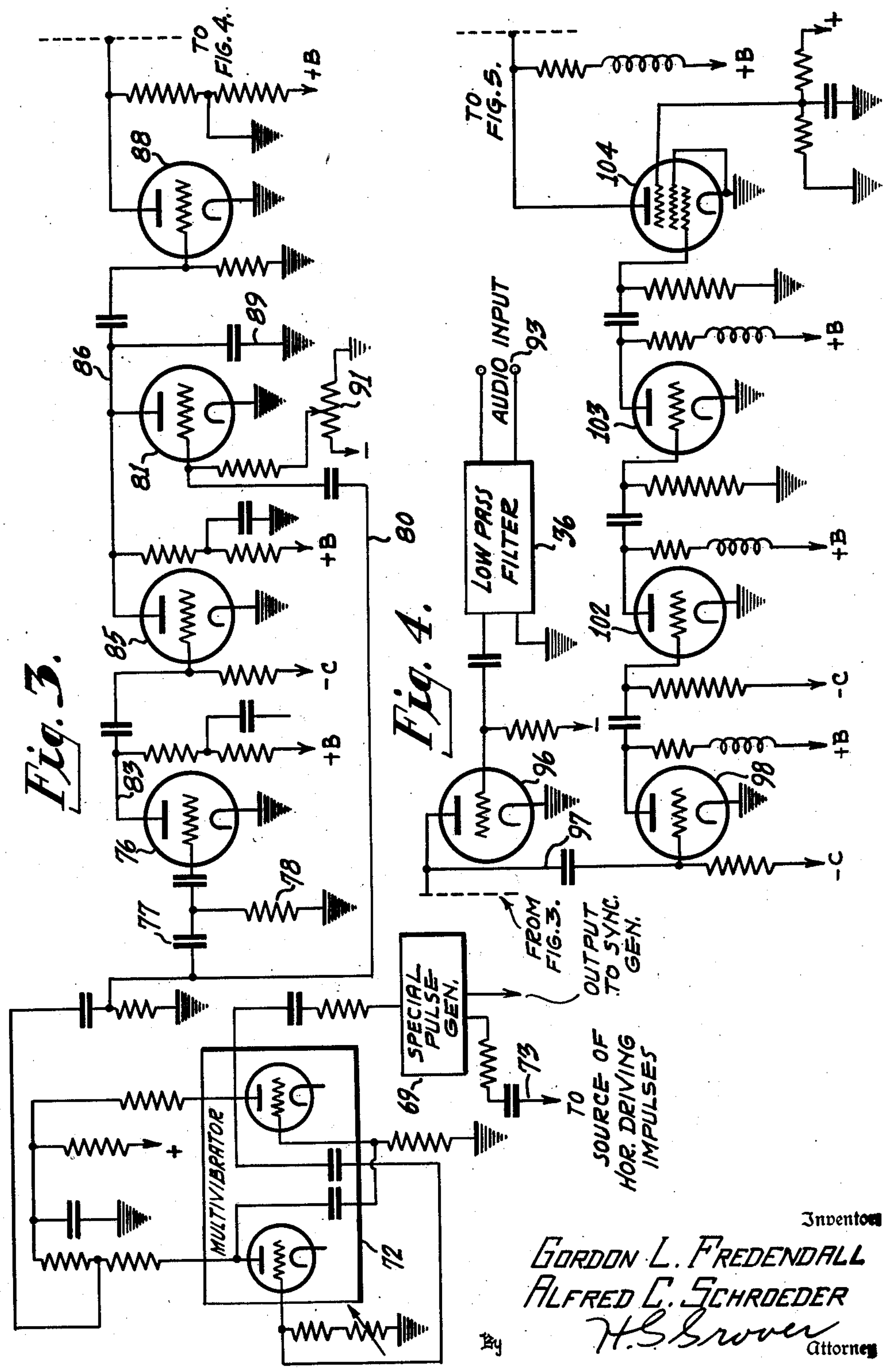
Figure 5:
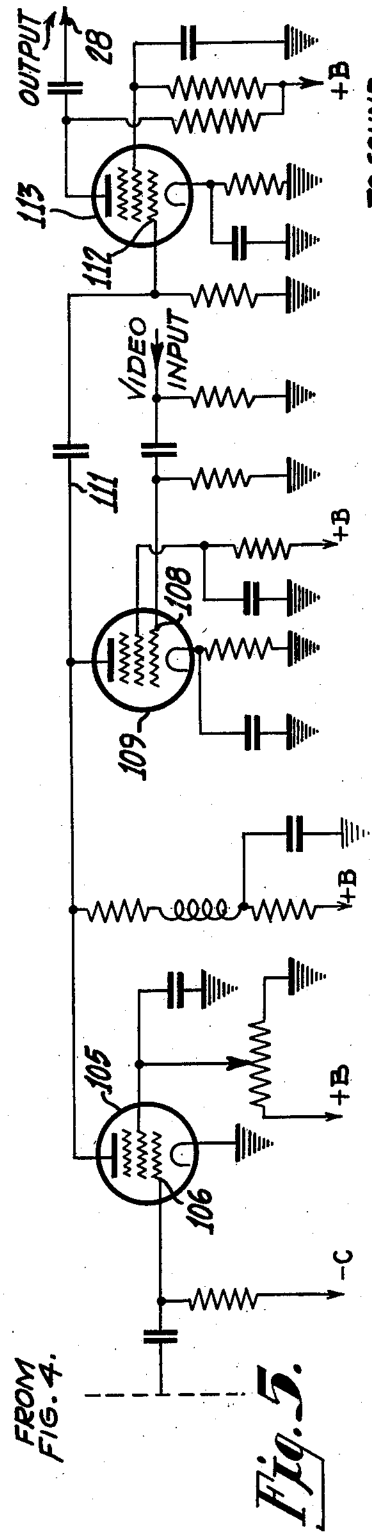
Figure 15:
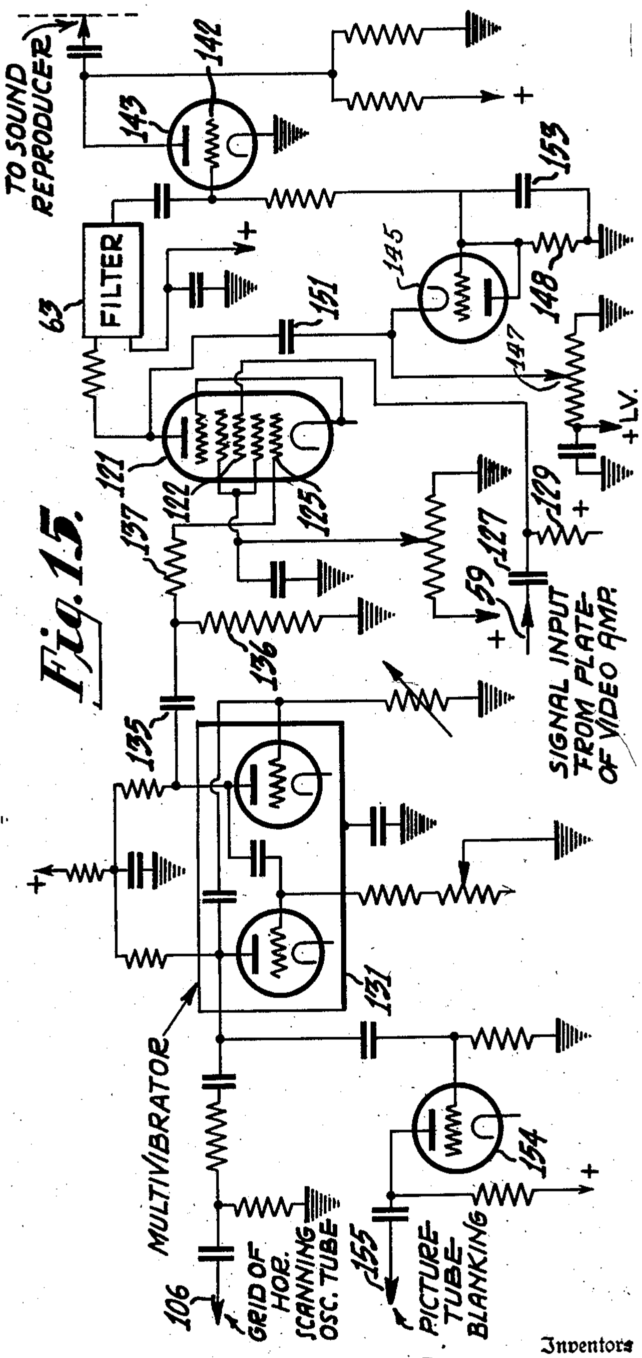
Figures 11, 12, 13, 14:
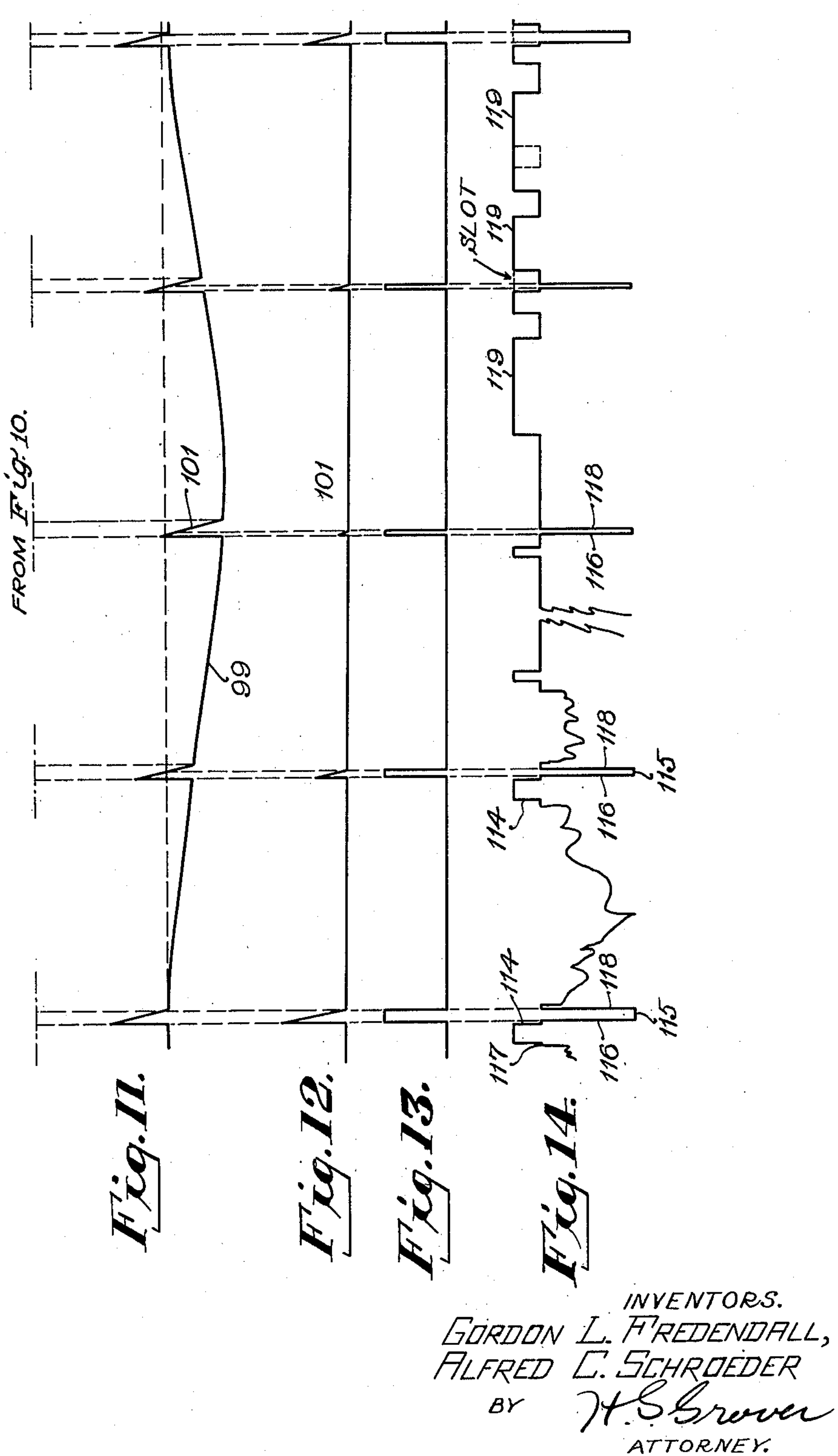

Figs. 3, 4 and 5 afford a more detailed illustration of a portion of the transmitter end of the system;

Figs. 6 through 13 illustrate the manner of deriving a signal, which represents the sound signal, in accordance with the invention in the form illustrated in Figs. 1, 3, 4 and 5;

Fig. 14 illustrates a composite signal including video variations synchronizing variations and the derived signal;

Fig. 15 affords a more detailed illustration of a portion of the receiver end of the system shown generally in Fig. 2 of the drawings, and Fig. 16 illustrates by curves designated *a*, *b* and *c*, the wave formations existing at different points in the receiver during the process of recreating original sound.

Figure 1:
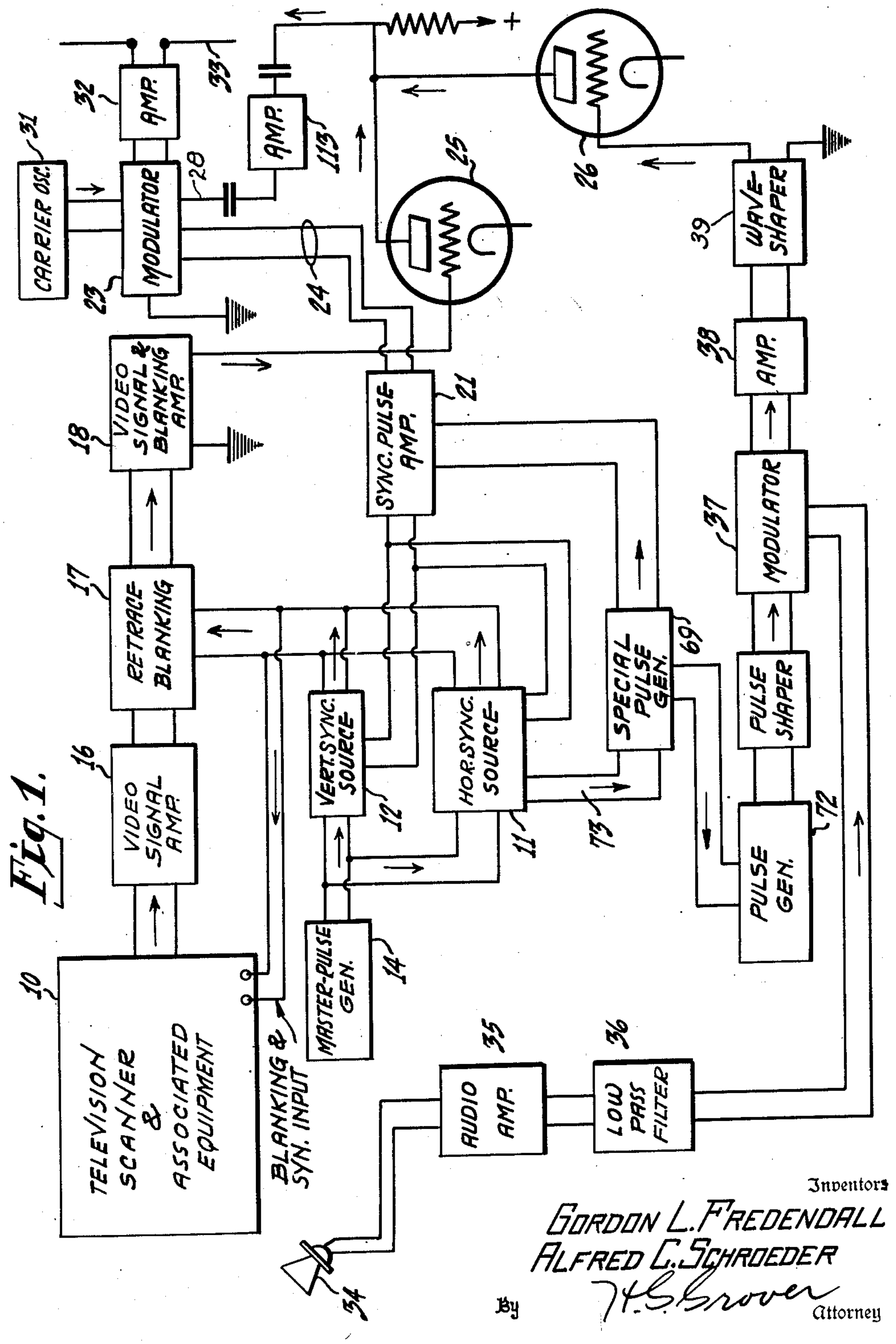
Fig. 1 illustrates conventionally and in block diagram form suitable arrangements for a transmitter embodying the present invention.

Referring to Figs. 1 and 2 of the drawings, reference character 10 indicates a television scanner and its associated equipment for generating image or video signals according to well known principles of operation. For example, the television transmission may be carried out in the manner disclosed in the patent to Bedford No. 2,284,714, which refers to additional patented art for refinements and details of the system. The Bedford patent is mentioned solely because of the fact that it illustrates one suitable form of cathode ray image scanning device. It is also to be understood that any form of mechanical scanning system may be used for producing image or video signals provided that a time interval occurs between trains of electrical signals representing scanned portions of the subject. Preferably, in practicing this invention, the time interval is provided by a slight time separation between the production of the series of electrical signals representing successive lines or elemental strips of the subject.

If, for example, it is assumed that the subject being analyzed is scanned over its entire area at a repetition rate of 30 complete frames per second and that an odd line double interlacing method of scanning is employed, each field having 262½ lines, the line frequency will be 15,750 lines per second. The entire time required to scan each elemental strip of subject matter will be of the order of $^1/_{15,750}$ of a second (about 65 microseconds) and approximately $\frac{1}{10}$ of this total time is occupied by the retrace or fly-back of the scanning beam. This portion of the total time allotted to the scanning of each elemental strip may, it is understood, be varied within wide limits and may be made to conform to any standard which may be set up for commercial reasons. It will be understood that a complete frame may be scanned at one time without resorting to interlaced scanning, or that even line interlaced scanning may be employed. Higher fidelity sound can be obtained by increasing the number of scanning lines so that the number of pulses of sound energy per picture field, assuming the same field repetition rate, will be higher, thus with vertical line scanning, the upper frequency register of the transmitted sound would be increased in the illustrative example from approximately seven kilocycles to approximately ten kilocycles.

The television scanning device 10 is operated to test or analyze the varying intensities of light and shadow on each elemental area of the subject, and if it is assumed that the device 10 is a cathode ray tube of the general type shown by the above noted Bedford patent and others, this tube may operate under the control of a horizontal synchronizing signal source 11 and a vertical synchronizing or framing signal source 12, each of which preferably generates a saw-tooth wave form output and which is adapted to control the deflecting fields governing the motion or deflection of the cathode ray within the television scanning device 10. A master pulse generator 14 controls and synchronizes the operation of the devices 11 and 12. In the illustrative example the horizontal synchronizing source will provide a frequency of 15,750 cycles per second (assuming a 525 picture) and the vertical synchronizing source 12 will provide a frequency of 60 cycles per second. Special provisions for interlacing, if it is employed as suggested, may be provided.

Each of the signal sources 11 and 12 may serve to control and bias to cut-off, at predetermined times, a picture signal amplifier 16, or a separate amplifier 17 may be provided to cut-off transmission from the scanner 10 during the horizontal and vertical retrace periods. The amplifier 16 has its input circuit supplied with energy from the television scanner 10 so that when it or the blanking amplifier 17, if it is used, is operative, the signal produced from the television scanner will be suitably amplified, but at other times there will be no video signal output to a signal and blanking amplifier 18. An amplifier 21 serves to amplify the pulses of energy resulting from the horizontal and vertical synchronizing sources 11 and 12. It will be understood by those skilled in the art that the amplifier 21 combines the horizontal and vertical synchronizing control pulses and shapes the combined resultant wave for application to a modulator 23 by way of a connection 24.

The output energy from the amplifier 18 is supplied to the modulator 23 by way of a signal combining tube 25. A tube 26, similar to the tube 25, serves to combine the derived sound signal, produced by apparatus to be described, with the video signals so that the total input to the modulator 23 appearing in a connection 28 includes the derived sound signal. The tubes 25 and 26 may be of the multi-grid type illustrated by tubes 105 and 109 on Fig. 5. Also, the tubes 25 and 26 may be combined in a duplex type single envelope. Energy from a carrier frequency oscillator 31 is supplied to the modulator 23 and the resulting modulated carrier frequency is suitably amplified by an amplifier 32 and transmitted by way of the radio antenna 33. If desired, transmission may be in accordance with the vestigial side band method disclosed in Patent No. 2,300,501 to Grundmann, granted November 3, 1942. The communication channel herein is indicated as a radio channel, although a wire or cable connecting link to the associated receiving points or stations is equally suitable.

The speech or other audible signals, which accompany the pictorial representations transmitted by the television scanner 10, are caused to influence the sound signal device shown conventionally as a microphone 34 and are then supplied to a sound amplifier 35 whose output energy is directed through a filter 36 to a modulator 37. The derived signal from the modulator 37 is amplified, if desirable or necessary, by an amplifier 38 and after its wave form is changed in a suitable manner in a wave shaper 39, it is applied to the input circuit associated with the tube 26, thereby to be combined with the video signals and at a subsequent stage in the modulating process with the synchronizing signals. The component parts 36 to 39 of the apparatus for generating the derived signal representing sound will be described more in detail hereinafter.

It is to be noted that equipment shown on Fig. 1, designated by reference characters 10 to 33, with the possible exception of the added tube 25, may be of any type suitable for generating and transmitting televsion signals since the apparatus which provides sound accompaniment in accordance with the present invention does not require any modification of apparatus chosen for reasons of economy and picture signal fidelity.

Fig. 2 of the drawings shows diagrammatically the equipment of a typical receiver which may be employed for receiving picture and sound signals radiated by the transmitter of Fig. 1. As the received energy includes sound, synchronizing and video signals, it is desirable that these signals be appropriately separated one from the other. The synchronizing signals are separated from the video signals in any well known manner, which may be either by a wave form selection, by an amplitude selection or by frequency discrimination. The receiver of Fig. 2 is illustrated as being of the usual superheterodyne type having a mixer stage 42 fed from an antenna 43, an intermediate frequency amplifier 46 and a detector and automatic frequency control stage 47. Signal separation is accomplished in the synchronizing signal separator 48 and control signals are supplied from this separator to the horizontal synchronizing control device 49 and the vertical synchronizing control device 51. Horizontal and vertical deflection generators 52 and 53, respectively, supply sweep frequencies of appropriate wave form to an image reproducing device 56. Video signals are supplied to the image reproducing device from the output circuit of a picture amplifier 57.

The vertical synchronizing signal is adapted not only to control the position at which the electro-optical effects in the image reproducing device 56 are produced, but also serves to render the video signal amplifier 57 or the image reproducing device 56, or both as desired, inoperative during the return line. Similarly, the horizontal synchronizing system which controls the line scanning rate is adapted to render either the picture signal amplifier 57 or the image reproducing device 56 inoperative during the return line or trace period between the reproduction of successive elemental strips of the picture. This type of control is well known and does not constitute a part of the present invention except insofar as it cooperates with the general combination of the various other elements to include novel subject matter. The receiver equipment thus far described may be of any type chosen to receive video signals from the transmitter of Fig. 1. The sound receiving and reproducing arrangements in accordance with the invention, now to be briefly described, are added without disturbing the usual function of the picture receiving equipment.

One arrangement in accordance with the invention for effecting recovery of the derived signal and its conversion to audible sound effects is shown diagrammatically in Fig. 2. The output of the video amplifier 57 is fed by way of a connection 59 to a selector device 60. Video and synchronizing signals, as well as the derived signal, are present in the connection 59 and, therefore, the function of the selector device 60 is to permit passage of signals from the connection 59 to a filter 63 only during the time when the derived signal is present. Operation of the selector device 60 is controlled by a local pulse generator 64 which is controlled over a connection 66 from the horizontal deflection generator 52. The output of the filter 63 is substantially a replica of the output of the filter 36 of Fig. 1 and may be fed to any suitable sound reproducer 68. Where the maximum sound frequency is less than one half of the line frequency, the output from the filter 63 may be made a replica of the input to the filter 36 so that the sound field at the microphone may be reproduced with high fidelity.

A more detailed description of the sound reproducing arrangement, shown diagrammatically by Fig. 2 of the drawings, and the operation of this arrangement will be provided after the following detailed description of the sound pickup system of Fig. 1 and its operation.

Figures 6, 7, 8, 9, 10:
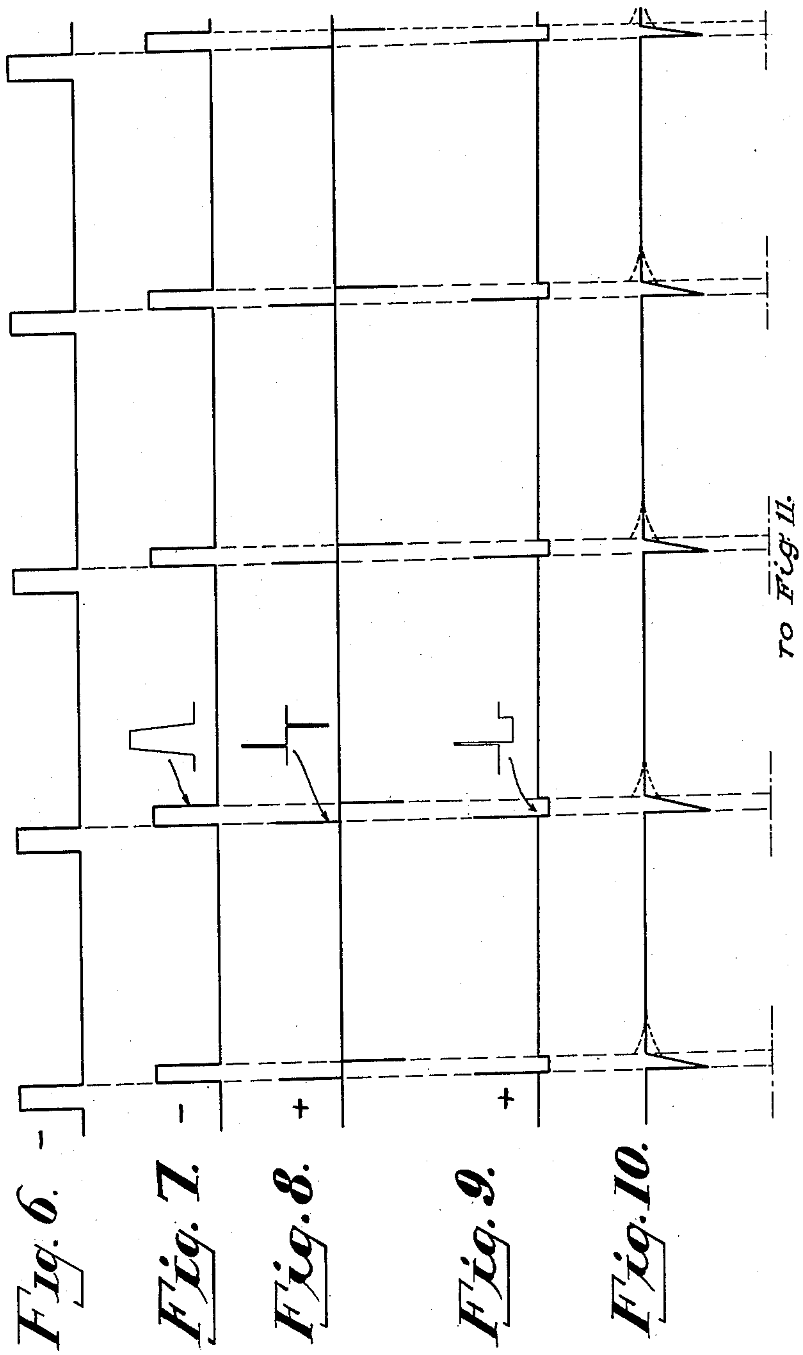

Referring now to Figs. 3 to 5 of the drawings, which show a specific embodiment of a sound signal channel according to the invention, a pulse generator (Figs. 1 and 5) may be a multivibrator 72 or any other well known type of shaped wave impulse generator. The output of the multivibrator 72 is locked in with the horizontal driving impulses provided by way of a connection 73. Impulses, employed to interrupt continuity of the vertical synchronization pulse as will be explained in connection with Fig. 14, are derived from an impulse generator 69. These impulses, fed to the multivibrator, are shown in Fig. 6 of the drawings, while Fig. 7 indicates the wave form of the output from the multivibrator 72. The output from the multivibrator is applied to the grid of a tube 76 by way of a high pass filter or differentiator circuit comprising a relatively large capacity 77 and a resistance 78 of relatively small value. The output wave from the multivibrator 72 is also impressed by way of a connection 80 upon the grid of a tube 81. The curve of Fig. 8 indicates the form of the voltage wave appearing at the anode 83 of the tube 76. The polarities of the loops of the waves of Figs. 6 and 7 are indicated by minus signs, whereas the voltage wave of Fig. 8 is reversed in polarity and is amplified by being applied to the grid of a vacuum tube 85. A single duplex vacuum tube of suitable characteristics such as the type 6N7 may replace the separate tubes 76 and 85 shown in the drawing.

The combined output current of the tubes 85 and 81, appearing in a connection 86 to a vacuum tube 88, is illustrated by the curve of Fig. 9 of the drawings. The voltage wave of Fig. 10 is of saw-tooth form and appears across a condenser 89 connected to the plates of the tubes 81 and 85. The tubes 81 and 88 may be combined in a single structure if desired. The characteristics of the tube type 6N7 are suitable for such purposes.

The voltage wave of Fig. 10 may take either form shown by the dotted lines, depending upon the adjustment of the biasing potentiometer 91 which provides bias for the control grid of the tube 81. The full line on Fig. 10 indicates the desired adjustment.

Fig. 4 shows the section of the apparatus which is devoted to modulation of the saw-tooth wave of Fig. 10 with audio input which is derived, for example, from the microphone 34 of Fig. 1. The input from the microphone to the low pass filter 36 (Figs. 1 and 4) is indicated at 93 on Fig. 4 of the drawings. The output of the low pass filter 36 is applied to the control grid of a vacuum tube 96 and the output of this tube is combined with the output of the tube 88 in a connection indicated by reference character 97. The wave form of the voltage impressed from the connection 97 on the control grid of a tube 98 is shown by Fig. 11 of the drawings when the audio signal appearing at 93 is a sine wave 99. The condition for 100% modulation occurs when the peak to peak amplitude of the impressed sine wave is substantially equal to the amplitude of the triangular pulses. The grid bias on the control grid of the tube 98 is adjusted to a voltage for which the pulse 101 (Fig. 11) is just visible on an oscilloscope or other indicating device when the modulation is 100%. This condition is illustrated by Fig. 12 of the drawings.

Successive clipper tubes 102, 103, 104 and 105 operate in such a manner that a substantially square voltage pulse is present on the grid 106 of the tube 105. The wave form of the signal appearing on the grid 106 is shown by Fig. 13 of the drawings.

The video signal is impressed on the signal grid 108 (Fig. 5) of a video signal amplifier tube 109. The outputs of the tubes 105 and 109 are combined in a connection 111, and this combined output is impressed upon the control grid 112 of an amplifier 113. The wave form of the signal appearing at the control grid 112 of the amplifier tube 113 is shown in Fig. 14 of the drawings. The horizontal synchronizing impulses, indicated by reference character 114, are added to the composite signal later. A vertical synchronizing blanking interval is shown by way of example, and it includes horizontal and equalizing pulses in the usual manner. The vertical synchronizing pulse 119 is notched by the special pulse generator 69 to provide for the derived sound signal 115 during the vertical synchronizing signal time. As pointed out above, tubes indicated by reference characters 105 and 109 provide a more detailed showing of tubes 25 and 26 of Fig. 1.

It will be seen that the transmission of sound is essentially the result of transmitting a series of variable width square pulses at the frequency of horizontal driving. The front edges 116 of successive pulses are substantially equally spaced and are fixed in time with respect to the beginning 117 of the blanking interval. The back edges 118 of the pulses 115 are modulated or shifted in position relative to the front edges in accordance with the audio modulation as shown by Fig. 14.

The output connection of the amplifier 113, indicated by reference character 28 in Figs. 1 and 5 of the drawings, is fed to the modulator 23.

As stated above any usual type of television receiver may be employed to receive signals transmitted from the antenna 33 of Fig. 1 and to recreate the image scanned by the television scanner 10. The sound signal apparatus added to the ordinary picture receiver, shown diagrammatically in Fig. 2 of the drawings will now be described more in detail with reference to Fig. 15. Similar reference characters will be used to denote corresponding sections of the equipment indicated in Fig. 2 of the drawings. The arrangement of Fig. 15 may be substituted for the sound intermediate frequency circuits in a standard television receiver. A further advantage of the invention, so far as it concerns receivers, is that the video intermediate frequency amplifiers need not be provided with special rejector circuits or the like to prevent distortion of and interference with the recreated picture.

A vacuum tube 121, forming the principal part of the selector device 60 (Fig. 2) serves to separate the sound signal from the video signal in order that the video signal will not appear in the sound channel and cause interference. The video signal containing the synchronizing pulses and sound pulses is applied to the grid 122 of the tube 121 by way of the connection 59 which may receive energy from the plate circuit of the video amplifier. The strength of the signal applied to the grid 122 is preferably about equal to the signal impressed on the grid of the image reproducing device 56 which may be a "Kinescope." The grid 122 of the tube 121 acts as a D. C. setter for the purpose of removing 60 cycle hum and other distortion which may have been added to the picture signal. Thus, the peaks of the horizontal synchronizing pulses and hence the tops of the blanking pulses supplied to the grid 122 of the tube 121 in the manner to be described are lined up or brought to substantially the same level. This is done in practice by selecting the grid circuit components comprising a condenser 127 and a resistor 129 experimentally by listening for minimum cross-talk into the sound.

The pulse generator 64, which may be a multivibrator of any desired type indicated by reference character 131, is synchronized by a signal taken from the horizontal oscillator circuit of the receiver by way of the connection 66. The output from the multivibrator 131 is applied as stated above to the grid 125 of the tube 121. The output from the multivibrator 131 occurs in timed relationship to the portion of the blanking pulse devoted to the sound signal in the manner shown by curves *a* and *b* of Fig. 16. This is accomplished by selection of the constants of the grid circuit elements indicated by reference characters 135, 136, and 137. It will be noted that the pulse from the multivibrator appearing on the grid 125 removes the cut-off bias in the tube 121 at a time which is slightly later than the side 116 of the sound pulse and that it terminates slightly ahead of the end 139 of the total blanking period. A clipping action thus takes place during the conduction period so that the audio output is selected near the center of the variable width sound pulse. The plate current of the tube 121 is shown by curve *c* of Fig. 16 and the dotted lines indicate that the front 141 of this pulse varies in time with respect to the frequency of the applied sound modulation at the transmitter. The low pass filter 63 (Figs. 2 and 15) passes only the audio frequency component to the grid 142 of an audio amplifier tube 143. The filter 63 preferably is designed so that it will considerably attenuate frequencies higher than half of the horizontal synchronizing frequency and serves to pass only the frequency components lying within the range of sound frequencies impressed on the microphone 34 (Fig. 1). The characteristics of the filters 36 and 63 are preferably similar. The bias of the amplifier tube 143 is regulated by a diode 145 so that, when the receiver is in synchronization with the incoming signal, the bias on the audio amplifier 143 is normal. Under these conditions the multivibrator 131 will also be in synchronization with the incoming signal. When the receiver is not synchronized, the bias voltage applied by the diode 145 is such as to bias off the audio amplifier tube 143. The rectifying circuit of the diode 145 includes a potentiometer 147 and a load resistor 148 and is fed from the output of the tube 121 by way of a connection 149 and a condenser 151. Bias for the grid 142 is obtained from the load resistor 148 which is by-passed by a condenser 153. By the arrangement just described undesirable audio noise during periods when the receiver is out of synchronism is eliminated.

A blanking pulse derived from the multivibrator 131 is amplified in the tube 154 and applied to the "Kinescope" by way of a connection 155 to insure blanking of the "Kinescope" during the sound transmission time. The blanking signal applied to the "Kinescope" by way of the connection 155 is or may be in addition to the usual "Kinescope" blanking connections.

It should also be understood in the consideration of this invention that for convenience of illustration square-topped waves with vertical sides have been illustrated by some of the curves. Such a shaped wave is substantially impossible to transmit and would, in practice, ordinarily be replaced by impulses with rounded corners and slightly sloping sides. The present illustration, therefore, must be regarded as being of a rather conventional nature and serving only to indicate and set forth the principles upon which the present invention is based rather than as defining the invention in any concrete and limiting form.

Having now described the invention, what is claimed and desired to be secured by Letters Patent is the following:

The method of receiving and translating video and sound signals transmitted by a single carrier where the sound signals are impulses of varying duration, comprising the steps of generating local pulses in timed relationship with said video signal, clipping one side of said local pulse and shifting the time of occurrence of the other side of said local pulse in accordance with the timed duration of the received impulse.

GORDON L. FREDENDALL.
ALFRED C. SCHROEDER.

REFERENCES CITED

The following references are of record in the file of this patent:

UNITED STATES PATENTS

| Number | Name | Date |
|---|---|---|
| 1,655,543 | Heising | Jan. 10, 1928 |
| 2,061,734 | Kell | Nov. 24, 1936 |
| 2,089,639 | Bedford | Aug. 10, 1937 |
| 2,227,108 | Roosenstein | Dec. 16, 1940 |
| 2,256,336 | Beatty | Sept. 16, 1941 |
| 2,266,194 | Guanella | Dec. 16, 1941 |
| 2,266,401 | Reeves | Dec. 16, 1941 |
| 2,268,001 | Von-Felgel Farnholz | Dec. 30, 1941 |
| 2,280,707 | Kell | Apr. 21, 1942 |